US012160156B2

United States Patent
Cooling et al.

(10) Patent No.: US 12,160,156 B2
(45) Date of Patent: Dec. 3, 2024

(54) PERMANENT MAGNET GENERATOR BRAKES WITH DUAL WEDGES

(71) Applicant: Hamilton Sundstrand Corporation, Charlotte, NC (US)

(72) Inventors: Aaron Cooling, Rockford, IL (US); Andrew P. Grosskopf, Rockford, IL (US); Glenn C. Lemmers, Jr., Loves Park, IL (US); Andreas C. Koenig, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 117 days.

(21) Appl. No.: 18/105,416

(22) Filed: Feb. 3, 2023

(65) Prior Publication Data
US 2024/0266911 A1   Aug. 8, 2024

(51) Int. Cl.
*H02K 7/102*   (2006.01)
*H02K 7/18*    (2006.01)
*H02K 11/21*   (2016.01)
*H02K 11/33*   (2016.01)

(52) U.S. Cl.
CPC ........... *H02K 7/102* (2013.01); *H02K 7/1823* (2013.01); *H02K 11/21* (2016.01); *H02K 11/33* (2016.01)

(58) Field of Classification Search
CPC ........ H02K 7/102; H02K 11/21; H02K 11/33; H02K 7/1823
USPC .......................................................... 318/366
See application file for complete search history.

(56) References Cited

U.S. PATENT DOCUMENTS

| 5,300,848 | A  | * | 4/1994  | Huss    | H02K 21/029 |
|           |    |   |         |         | 310/191     |
| 6,455,975 | B1 | * | 9/2002  | Raad    | H02K 7/125  |
|           |    |   |         |         | 310/51      |
| 7,849,668 | B2 |   | 12/2010 | Sheridan |            |
| 2008/0078631 | A1 | * | 4/2008 | Erlston | H02K 1/141  |
|           |    |   |         |         | 188/159     |
| 2011/0123339 | A1 | * | 5/2011 | Eriksen | F03D 7/0248 |
|           |    |   |         |         | 416/169 R   |
| 2012/0187683 | A1 | * | 7/2012 | Wohlleb | F03D 15/10  |
|           |    |   |         |         | 290/44      |

(Continued)

FOREIGN PATENT DOCUMENTS

CN   213230903 U    5/2021
EP     2526313 B1    3/2015

(Continued)

OTHER PUBLICATIONS

European Search Report dated Aug. 7, 2024 in connection with European Patent Application No. 24155365.0, 10 pages.

*Primary Examiner* — Gabriel Agared

(57) ABSTRACT

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. A shear shaft is operatively connected to a second end of the brake shaft axially opposite the first end along the longitudinal axis. The brake system includes a wedge with a first position radially withdrawn from the brake shaft, and a second position radially pressed against the brake shaft for applying braking forces to the brake shaft and to the generator shaft.

18 Claims, 2 Drawing Sheets

(56) References Cited

U.S. PATENT DOCUMENTS

| | | |
|---|---|---|
| 2015/0270760 A1* | 9/2015 | Kreidler ................. H02K 7/125 |
| | | 310/156.32 |
| 2020/0096062 A1 | 3/2020 | Smith |
| 2020/0099322 A1 | 3/2020 | Smith |
| 2020/0220439 A1* | 7/2020 | Sigmar ................. H02K 11/33 |

FOREIGN PATENT DOCUMENTS

| | | |
|---|---|---|
| JP | S52-70278 A | 6/1977 |
| JP | 2000-325172 A | 11/2000 |
| WO | 2011089068 A1 | 7/2011 |

* cited by examiner

PERMANENT MAGNET GENERATOR BRAKES WITH DUAL WEDGES

BACKGROUND

1. Field

The present disclosure relates to power generation, and more particularly to brakes for permanent magnet generators (PMGs) such as used with gas turbine engines to generate electrical power.

2. Description of Related Art

Wound field synchronous machine type generators have been used for power generation aboard aircraft with prime mover power input from the aircraft engine, e.g. gas turbine engines. Permanent magnet generators (PMGs) offer various operation advantages over synchronous field generators. However PMGs introduce a novel issue as synchronous machine type generators can simply be de-excited to stop feeding a fault in a very short time.

In a permanent magnet generator, any time the rotor is spinning, a voltage is being applied to the stator. If a short circuit fault occurs in the stator, the fault will continue to be active until the generator is at zero speed. Permanent magnet machines cannot be de-excited, they must be brought to zero speed to stop feeding the fault. This is particularly challenging because PMGs can spin two to five times faster than traditional would field synchronous machines.

The conventional techniques have been considered satisfactory for their intended purpose. However, there is an ever present need for improved systems and methods for PMG braking, e.g. in conjunction with aircraft engines. This disclosure provides a solution for this need.

SUMMARY

A system includes a permanent magnet generator (PMG) with a generator shaft defining a longitudinal axis. A brake system includes a brake shaft with a first end operatively connected to the generator shaft for selectively rotating with the generator shaft or braking to slow the generator shaft. A shear shaft is operatively connected to a second end of the brake shaft axially opposite the first end along the longitudinal axis. The shear shaft is configured for connection to a prime mover for rotation of the generator shaft, and is configured to rotate together with the prime mover and with the brake shaft under normal conditions, and to disconnect the prime mover from the brake shaft if subjected to a predetermined torque. The brake system includes a wedge with a first position radially withdrawn from the brake shaft, and a second position radially pressed against the brake shaft for applying braking forces to the brake shaft and to the generator shaft, wherein the brake system includes an actuator operatively connected to the wedge to actuate the wedge from the first position to the second position.

A second wedge can have a first position radially withdrawn from the brake shaft, and a second position radially pressed against the brake shaft for applying braking forces to the brake shaft and to the generator shaft. The actuator can be operatively connected to the second wedge to actuate the first and second wedges together between the first and second positions of the first and second wedges. The second wedge can be radially opposite the first wedge relative to the longitudinal axis. In the second position of the first and second wedges, the first wedge can contact a position on the brake shaft that is diametrically opposed to a position on the brake shaft where the second wedge contacts the brake shaft, relative to the longitudinal axis. The PMG can be configured to be driven in a rotational direction, and the first and second wedges can be oriented so that contact with the brake shaft urges the wedges toward the brake shaft due to the rotation direction of the PMG. The brake system can include a housing with a respective backing surface. The first and second wedges in their second positions can be wedged between the respective backing surface and the brake shaft.

The actuator can include a servo valve. The first wedge can include a first piston seated in a cylinder. The second wedge can include a second piston seated in a second cylinder. The first cylinder can be in fluid communication with a control line of the servo valve through a first conduit. The second cylinder can be in fluid communication with the control line through a second conduit. The servo valve can have a first state allowing a supply to flow from an inlet of the servo valve to an outlet of the servo valve to a return, and a second state connecting pressure from the inlet of the servo valve in fluid communication with the control line for pressurizing the first and second pistons to drive the first and second wedges to their section positions.

A first biasing member can bias the first piston toward the first position, wherein the first biasing member is configured to maintain the first piston in the first position with no pressure supplied from the servo valve. A second biasing member can bias the second piston toward the first position, wherein the second biasing member is configured to maintain the second piston in the first position with no pressure supplied from the servo valve. The first wedge can have a piston surface in fluid communication with the first conduit in the first position, and the second wedge can have a piston surface in fluid communication with the second conduit in the first position.

A gas turbine engine (GTE) can be operatively connected to the shear shaft to drive the PMG as a prime mover. A servo valve can be operatively connected to actuate the wedge between the first and second positions. The servo valve can be a hydraulic servo connected to an oil system that provides oil to the PMG and/or to the GTE.

A generator control unit (GCU) can be operatively connected to the PMG for controlling electrical output of the PMG. The GCU can be operatively connected to the servo valve, which can be operatively connected to actuate the wedge based on commands from the GCU. A sensor can be operatively connected to the GCU to provide feedback for controlling the brake system. The sensor can include a speed sensor operatively connected to provide feedback to the GCU indicative of speed of the generator shaft. The sensor can include a voltage sensor operatively connected to a voltage output of the PMG to generate feedback to the GCU indicative of voltage output of the PMG. The GCU can be configured to output servo current to the servo valve for control of braking of the generator shaft. The GCU can include machine readable instructions configured to cause the GCU to receive input indicative of a fault condition for the PMG, and enter into a braking mode based on the input indicative of the fault condition; and output a command to a servo valve for dynamic control of the brake system for dynamically applying braking to the generator shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
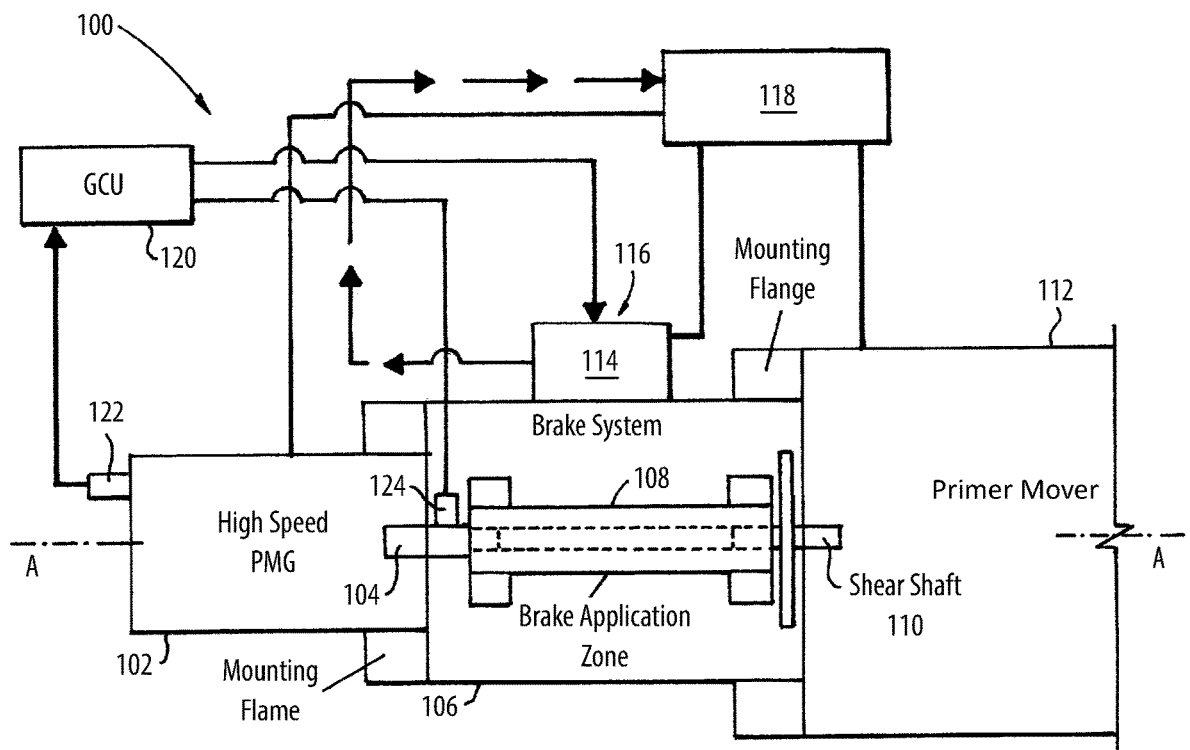
FIG. 1 is a schematic view of an embodiment of a system constructed in accordance with the present disclosure, showing the brake system between the permanent magnet generator (PMG) and the gas turbine engine (GTE)

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide protection against main stator arcing events for permanent magnet generator (PMG) systems such as used with aircraft engines and the like.

The system 100 includes a permanent magnet generator (PMG) 102, e.g. a high speed PMG for power generation on an aircraft, with a generator shaft 104 defining a longitudinal axis A. A brake system 106 includes a brake shaft 108 with a first end operatively connected to the generator shaft 104, e.g. with a spline, for selectively rotating with the generator shaft 104 or braking to slow the generator shaft 104.

A shear shaft 110 is operatively connected, e.g. with a spline or the like, to a second end of the brake shaft 108 axially opposite the first end along the longitudinal axis A. The shear shaft 110 is configured for connection to the prime mover 112 for rotation of the generator shaft, and is configured to rotate together with the prime mover and with the brake shaft 108 under normal conditions. The shear shaft 110 is configured to disconnect the prime mover 112 from the brake shaft 108 if subjected a predetermined torque differential between the prime mover and the brake shaft, i.e. when the brake is applied as described below. The shear shaft can include a necking down, frangible structure, burstable structure, or the like, designed to break or burst at the predetermined torque.

With continued reference to FIG. 1, the actuator 116 of the brake system 100 includes a servo valve 114. The prime mover 112 is a gas turbine engine (GTE) that operatively connected to the shear shaft 110 to drive the PMG 102. The servo valve 114 is a hydraulic servo connected to an oil system 118 that provides oil to the PMG 102 and/or to the GTE for cooling and/or lubrication. The oil system 118 provides actuating oil to the servo valve 114 for use in actuating the braking system 100 as described below.

A generator control unit (GCU) 120 is operatively connected to the PMG 102 for controlling electrical output of the PMG 102. The GCU 120 is operatively connected to the servo valve 114, which is operatively connected to actuate the brake system 106 based on commands from the GCU 120. A sensor 122 is operatively connected to the GCU 120 to provide feedback for controlling the brake system 106. The sensor 122 includes a voltage, current, and/or electrical fault sensor operatively connected to the output of the PMG 102 to generate feedback to the GCU 120 indicative of electrical output of the PMG 102 and/or a fault in the PMG 102. It is also contemplated that in addition to or in lieu of the sensor 122, a sensor 124 can be a speed sensor operatively connected to provide feedback to the GCU 120 indicative of speed of the generator shaft 104, or the PMG 102 itself can be used as a speed sensor. The GCU 120 is configured to output servo current to the servo valve 114 for control of braking of the generator shaft 104.

With continued reference to FIG. 1, the GCU 120 includes machine readable instructions, e.g. digital code, digital logic components, analog circuitry, and/or the like, configured to cause the GCU 120 to receive input, e.g. from the sensors 122, 124, indicative of an electrical fault condition for the PMG 120, e.g. a main stator short, wherein PMG 120 needs to be stopped, and enter into a braking mode based on the input indicative of the fault condition; and output a command, e.g. servo current, to the servo valve 114 for dynamic control of the brake system 106 for dynamically applying braking to the generator shaft 104.

Figure 2:
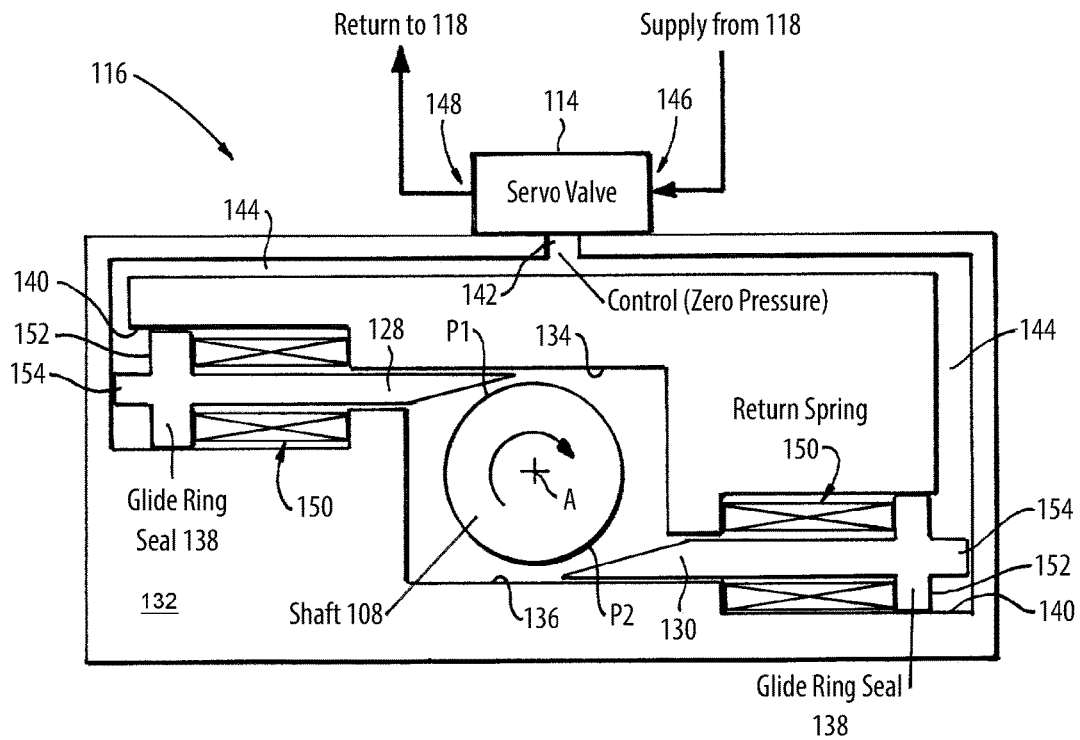
FIG. 2 is a schematic view of the system of FIG. 1, showing the wedges of the brake system in the first position for normal operation of the PMG.
Figure 3:
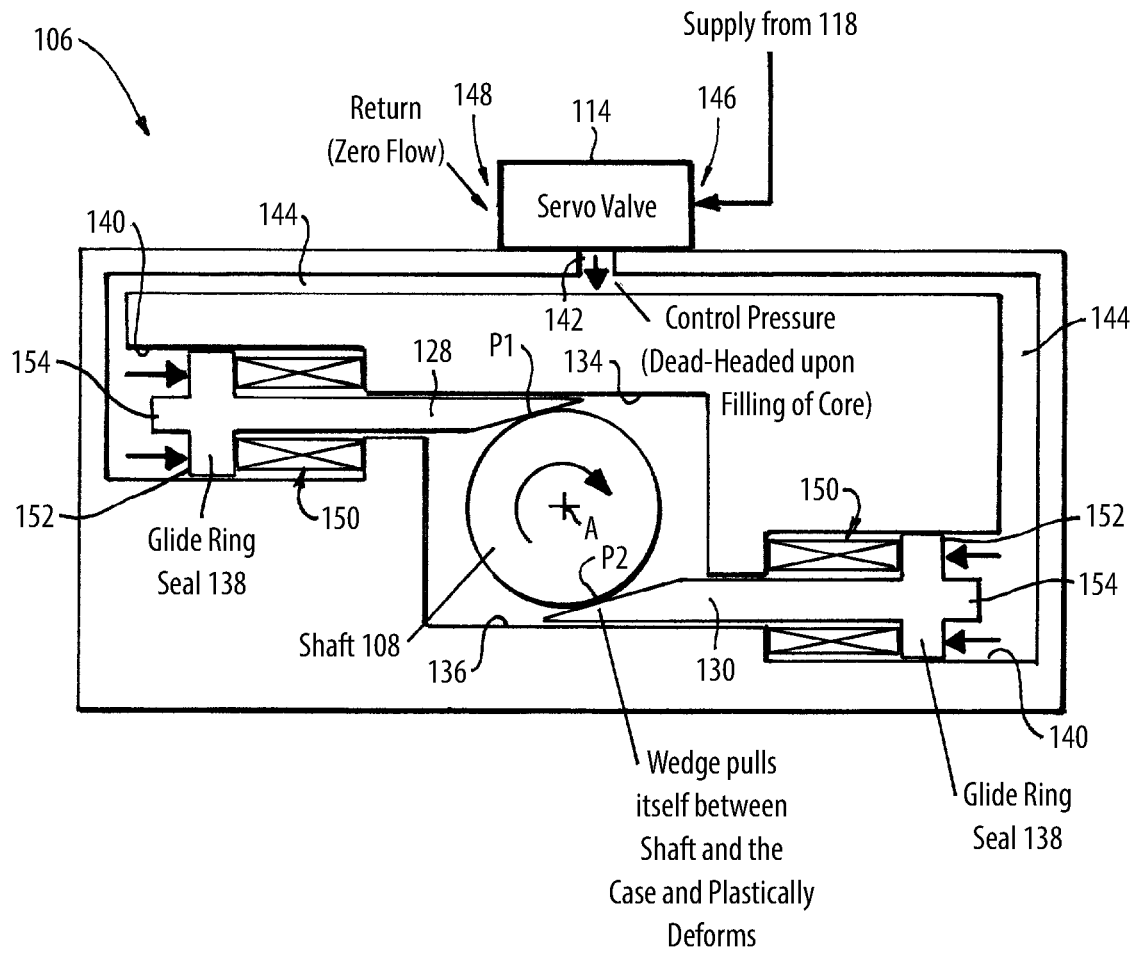
FIG. 3 is a schematic view of the system of FIG. 1, showing the wedges of the brake system in the second position for braking.

With reference now to FIGS. 2-3, the brake system 106 includes a first wedge 128 and a second wedge 130. The first and second wedges have a first position, shown in FIG. 2 that is radially withdrawn from the brake shaft 108 for normal operation of the PMG 102 (labeled in FIG. 1). The wedges 128, 130 have a second position, shown in FIG. 3, radially pressed against the brake shaft 108 for applying braking forces to the brake shaft 108 and thereby to the generator shaft 104 (labeled in FIG. 1), for slowing and stopping rotation of the PMG 102 labeled in FIG. 1. The shear shaft 110 ruptures due to torque applied by the braking forces, then the PMG 102 is brought to zero speed.

The actuator 116 of the brake system 106 is operatively connected to the wedges 128, 130 to actuate the wedges 128, 130 from the first position (in FIG. 2) to the second position (in FIG. 3). The actuator 116 includes the servo valve 114, which is operatively connected to actuate the wedges 128, 138 between the first and second positions based on commands from the GCU 120 labeled in FIG. 1.

The second wedge 130 is radially opposite the first wedge 128 relative to the longitudinal axis A, in other words, the first wedge 128 extends to the left of the shaft 108 and the second wedge 130 extends to the right as oriented in FIGS. 2-3, radially opposite directions from the longitudinal axis A. In the second position of the first and second wedges 128, 130 shown in FIG. 3, the first wedge 128 contacts a position P1 on the brake shaft 108 that is diametrically opposed to a position P2 on the brake shaft 108 where the second wedge 130 contacts the brake shaft 108, relative to the longitudinal axis A. The PMG 102 (labeled in FIG. 1) is configured to be driven in a rotational direction indicated by the rotation arrow in FIGS. 2-3. The first and second wedges 128, 130 are oriented so that contact with the rotating brake shaft 108 urges the wedges 128, 130 toward the brake shaft 108 due to the rotation direction of the PMG 102 (labeled in FIG. 1). The brake system 106 includes a housing 132 with a respective backing surface 134, 136 for each of the wedges 128, 130. The first and second wedges 128, 130 in their second positions as shown in FIG. 3 are wedged between the respective the respective backing surfaces 134, 136 and the brake shaft 108.

Each first wedge 128, 130 includes a piston 138 seated in a cylinder 140, e.g. as a glide ring seal, tight clearance, or the like where some leakage may be acceptable. The cylinders 140 are each in fluid communication with a control line 142 of the servo valve 114 through a respective conduit 144, e.g. inside the housing 132. The servo valve 114 has a first state shown in FIG. 2 allowing a supply from the oil system 118 to flow from an inlet 146 of the servo valve 114 to an outlet 148 of the servo valve 114 to a return of the oil system 118. The servo valve 114 has a second state shown in FIG. 3, connecting pressure from the inlet 146 of the servo valve 114 in fluid communication with the control line 142 for pressurizing the first and second pistons 138 to drive the first and second wedges 128, 130 to their section positions.

Each cylinder 140 includes a respective biasing member 150, e.g. spring, Bellville washer, complaint mechanism, or the like, which biases the pistons 138 toward the first position shown in FIG. 2. The biasing members 150 are configured to maintain the piston 138 in the first position when there is no pressure supplied from the servo valve 114 to the conduits 144. Pressure supplied from the control line 142 with the servo valve 114 in the second state, shown in FIG. 3, overcomes the biasing members 150 to move the wedges 128, 130 into the second position. Rotation of the brake shaft 108 pulls the wedges in-between the backing surfaces 134, 136 of the housing 132 and the brake shaft 108, potentially plastically deforming the wedges 128, 130. Each of the wedges has a respective piston surface 152 in fluid communication with the respective conduit 144, even in the first position. This can be maintained in the first position, e.g. with the standoffs 154 or by having the conduits 155 feed into axial ports onto the surfaces 152.

With reference again to FIG. 1, systems and methods as disclosed herein can operate by first disconnecting the PMG rotor from the prime mover and second by bringing the rotor to zero speed as quickly as possible. A high-speed PMG can be connected to a separate brake system, or the brake system can be integral to the PMG 102. The shear shaft 110 ruptures at a specified torque that is be high enough such that it does not rupture during normal operation but does rupture when the brake is applied as described above with reference to FIG. 3. Once the brake is applied, the shear shaft 110 ruptures, and the PMG 102 is disconnected from the prime mover 112. After this disconnection, the brake system 106 quickly slows the high speed PMG 102 down to zero speed.

Under normal operating conditions, the servo valve 114 is in constant bypass mode as shown in FIG. 2, where no oil pressure is applied to the pistons 138, i.e. there is zero control pressure. The biasing members 150 of FIG. 2 keep the wedges 128, 130 pushed back from the brake shaft 108 and thus not engaged.

Under a main stator failure in the PMG 102, for example, the servo valve 114 is set, e.g. by the GCU 120 to zero bypass mode, where the return port is completely blocked off and flow is directed to pressure the control line 142. This control pressure pushes the wedges 128, 130 into the second position shown in FIG. 3. The drag torque created by this wedging ruptures the shear shaft 110 of FIG. 1. After the rupture occurs, the wedges 128, 130 continue to be pulled into the gap between the brake shaft 108 and the housing 132 and quickly bring the rotor of the PMG 102 to zero speed.

The methods and systems of the present disclosure, as described above and shown in the drawings, provide for main stator arcing protection for PMG systems such as used with aircraft engines and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
   a permanent magnet generator (PMG) with a generator shaft defining a longitudinal axis;
   a brake system, wherein the brake system includes a brake shaft with a first end operatively connected to the generator shaft for selectively rotating with the generator shaft or braking to slow the generator shaft; and
   a shear shaft operatively connected to a second end of the brake shaft axially opposite the first end along the longitudinal axis, the shear shaft being configured for connection to a prime mover for rotation of the generator shaft, and being configured to rotate together with the prime mover and with the brake shaft under normal conditions, and to disconnect the prime mover from the brake shaft if subjected to a predetermined torque;
   wherein the brake system includes a wedge with a first position radially withdrawn from the brake shaft, and a second position radially pressed against the brake shaft for applying braking forces to the brake shaft and to the generator shaft, wherein the brake system includes an actuator operatively connected to the wedge to actuate the wedge from the first position to the second position.

2. The system as recited in claim 1, wherein the wedge is a first wedge and further comprising a second wedge with a first position radially withdrawn from the brake shaft, and a second position radially pressed against the brake shaft for applying braking forces to the brake shaft and to the generator shaft, wherein the actuator is operatively connected to the second wedge to actuate the first and second wedges together between the first and second positions of the first and second wedges.

3. The system as recited in claim 2, wherein the second wedge is radially opposite the first wedge relative to the longitudinal axis.

4. The system as recited in claim 2, wherein, in the second positions of the first and second wedges, the first wedge contacts a position on the brake shaft that is diametrically opposed to a position on the brake shaft where the second wedge contacts the brake shaft, relative to the longitudinal axis.

5. The system as recited in claim 4, wherein the PMG is configured to be driven in a rotational direction, wherein the first and second wedges are oriented so that contact with the brake shaft urges the wedges toward the brake shaft due to the rotation direction of the PMG.

6. The system as recited in claim 5, wherein the brake system includes a housing with a respective backing surface, wherein the first and second wedges in their second positions are wedged between the respective backing surface and the brake shaft.

7. The system as recited in claim 2, wherein the actuator includes a servo valve, wherein the first wedge includes a first piston seated in a cylinder, wherein the second wedge includes a second piston seated in a second cylinder, wherein the first cylinder is in fluid communication with a control line of the servo valve through a first conduit, wherein the second cylinder is in fluid communication with the control line through a second conduit, and wherein the servo valve has a first state allowing a supply to flow from an inlet of the servo valve to an outlet of the servo valve to a return, and a second state connecting pressure from the inlet of the servo valve in fluid communication with the control line for pressurizing the first and second pistons to drive the first and second wedges to their second positions.

8. The system as recited in claim 7, further comprising:
   a first biasing member biasing the first piston toward the first position, wherein the first biasing member is configured to maintain the first piston in the first position with no pressure supplied from the servo valve; and
   a second biasing member biasing the second piston toward the first position, wherein the second biasing member is configured to maintain the second piston in the first position with no pressure supplied from the servo valve.

9. The system as recited in claim 8, wherein the first wedge has a piston surface in fluid communication with the first conduit in the first position, and wherein the second wedge has a piston surface in fluid communication with the second conduit in the first position.

10. The system as recited in claim 1, further comprising a gas turbine engine (GTE) operatively connected to the shear shaft to drive the PMG as the prime mover.

11. The system as recited in claim 10, further comprising a servo valve operatively connected to actuate the wedge between the first and second positions, wherein the servo valve is a hydraulic servo connected to an oil system that provides oil to the PMG and/or to the GTE.

12. The system as recited in claim 1, further comprising a generator control unit (GCU) operatively connected to the PMG for controlling electrical output of the PMG.

13. The system as recited in claim 12, wherein the GCU is operatively connected to a servo valve, which is operatively connected to actuate the wedge based on commands from the GCU.

14. The system as recited in claim 13, further comprising a sensor operatively connected to the GCU to provide feedback for controlling the brake system.

15. The system as recited in claim 14, wherein the sensor includes a speed sensor operatively connected to provide feedback to the GCU indicative of speed of the generator shaft.

16. The system as recited in claim 14, wherein the sensor includes a voltage sensor operatively connected to a voltage output of the PMG to generate feedback to the GCU indicative of voltage output of the PMG.

17. The system as recited in claim 16, wherein the GCU is configured to output servo current to the servo valve for control of braking of the generator shaft.

18. The system as recited in claim 12, wherein the GCU includes machine readable instructions configured to cause the GCU to:
   receive input indicative of a fault condition for the PMG, and enter into a braking mode based on the input indicative of the fault condition; and
   output a command to a servo valve for dynamic control of the brake system for dynamically applying braking to the generator shaft.

* * * * *

UNITED STATES PATENT AND TRADEMARK OFFICE
CERTIFICATE OF CORRECTION

| | | |
|---|---|---|
| PATENT NO. | : 12,160,156 B2 | Page 1 of 1 |
| APPLICATION NO. | : 18/105416 | |
| DATED | : December 3, 2024 | |
| INVENTOR(S) | : Cooling et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this
Twentieth Day of May, 2025

Coke Morgan Stewart
*Acting Director of the United States Patent and Trademark Office*